United States Patent [19]

Boeckmann

[11] Patent Number: 4,675,902
[45] Date of Patent: Jun. 23, 1987

[54] HIGH PERFORMANCE TELEPHONE INSTRUMENT WITH COMBINATION PULSE AND TONE DIALING CAPACITY

[75] Inventor: Eduard F. B. Boeckmann, Huntsville, Ala.

[73] Assignee: GTE Communication Systems, Inc., Northlake, Ill.

[21] Appl. No.: 778,995

[22] Filed: Sep. 23, 1985

[51] Int. Cl.⁴ .............................................. H04M 1/26
[52] U.S. Cl. ...................................... 379/394; 379/387
[58] Field of Search ........... 179/81 R, 70, 77, 16 AA, 179/90 K, 90 R, 90 B

[56] References Cited

U.S. PATENT DOCUMENTS

| 4,413,159 | 11/1983 | Huizinga | 179/81 R |
| 4,527,016 | 7/1985 | Sublette | 179/77 |
| 4,550,226 | 10/1985 | Teater | 179/81 R |

OTHER PUBLICATIONS

EDN, "Single-Chip Repertory Dialer Affords Dual-Dial-Mode Telephone", Mar. 22, 1984, pp. 191-198.
Telecommunications, "Semiconductor Technology Impacts Station Apparatus", Aug. 1980, pp. 62-64.
Ericsson Review, "All Telephone Functions in One Chip PBL3780", review 3, 1985, pp. 138-143.

Primary Examiner—Gene Z. Rubinson
Assistant Examiner—C. Champion
Attorney, Agent, or Firm—Robert J. Black

[57] ABSTRACT

An electronic telephone instrument circuit capable of dialing (address signaling) in either pulse or tone mode. The circuitry permits the placement of a call through a rotary dial only system into a second network that is of a tone only nature. The included circuitry has very high return loss and relatively high level of tone capability and is designed to function with a variety of types of dialer integrated circuits. The present circuitry provides part of its DC current supervision while in the voice mode through the included tone amplifiers circuit thereby minimizing components and reducing current load through the voice network.

8 Claims, 2 Drawing Figures

HIGH PERFORMANCE TELEPHONE INSTRUMENT WITH COMBINATION PULSE AND TONE DIALING CAPACITY

BACKGROUND OF THE INVENTION

1. Technical Field

The present invention relates to electronic telephone instruments and more particularly to an electronic telephone instrument that is capable of dialing (address signaling) in either a pulse mode or in a tone mode.

2. Background Art

Most of the first generation of electronic telephones consisted of either a pulse dial integrated circuit and a voice network integrated circuit plus a number of external discrete components or in the alternative a DTMF tone dialer integrated circuit and a voice network integrated circuit. We will hereinafter refer to a pulse dialer integrated circuit as a "pulse dialer" and the DTMF related version as a "tone dialer". Examples of this type of telephone where the GTE Flip-Phone II ® which employ a pulse dialer, as manufactured by GTE Communication Systems Corporation, and similar telephones manufactured by a number of other manufacturers. The next generation of telephone added memory capability wherein as many as ten complete telephone numbers (station addresses) or more can be stored in the pulse dialer for future recall and dialing out. An example of this type of telephone was the GTE Flip-phone ® III pulse dialer also manufactured by GTE Communication Systems Corporation.

An intermediate or third generation was the combination pulse dialer and tone dialer instrument that included two integrated circuits for dialing, a pulse dialer and a tone dialer and was switchable between the two modes. An example of this type of telephone is the GTE Communication Systems Corporation Linear II ® telephone which employs a Mostek 5175 pulse dialer and control device and the Mostek 5380 tone dialer. While this instrument utilize a coil type voice network it could have employed an integrated circuit for utilization in the voice mode.

The fourth generation of electronic telephones appears to be a switchable pulse-tone instrument with ten or twenty numbers of storage usually of sixteen to twenty-two digits each. This version will be of lower price than the third generation and will become standard as to features and basic configuration of the dialer integrated circuit. The latter will have a certain standard input and output function such as pulse output, tone output, mute output, mode input and hookswitch sensed input to name the basic functions. The keypad interface is usually twelve to sixteen buttons arranged in an XY matrix and directly connected in a four row and three or four column arrangement to the dialer integrated circuit.

A number of problems not solved in the prior art and addressed by this invention which are associated with switchable instruments include the following: (1) correct DC current supervision in both tone and pulse mode; (2) amplification of DTMF signals; (3) proper impedance attained for both voice and tone modes (source impedance and return loss); (4) method of powering the dialer integrated circuit in the pulse mode versus operation in the tone mode; (5) eliminating a second mechanical hookswitch by means of an electronic hookswitch sense circuit.

The electronic voice network (EVN) integrated circuit is a cost saving feature replacing the old style induction coil network. Certain characteristics of a typical electronic voice network are also important to the design of the switchable telephone instruments. These include: (1) necessity for correct circuit impedance (elimination of AC loading by the dial network; (2) a minimum of voltage drops to maintain operation of the circuit at very low loop voltages; (3) the capability of high receive and transmit levels under long loop conditions with low side tone condition; (4) the DTMF amplifiers incorporated must allow for proper DC current supervision source impedance and muting in the tone mode.

SUMMARY OF THE INVENTION

The major aspects of the invention center on a generalized approach to the circuit design of the external dialer supporting circuitry and the electronic voice network interface. First it is assumed that the dialer requires approximately 2 milliamperes of current to operate whether it is in pulse mode or in the tone mode. Therefore a current source is needed that provides the operating current that cuts off during pulse "break" intervals to meet break impedance requirements. This is accomplished by a current source that is switched off by the the output break portion of pulse.

During the break interval, operating power is provided by a charged capacitor of relatively large value. The current source is a conventional constant current high AC impedance source that is switched on and off by interrupting its reference current. The switching of the reference current is accomplished by using the dial pulse itself as a gating pulse to a transistor acting as a switch. With this design it is not necessary to change values or configurations of the power supply for the dialer IC when switching from pulse to tone mode or vice versa therefore eliminating mechanical switch contacts and other components. Secondly the invention provides automatic correction of DC current supervision whether in the tone mode, pulse mode or voice mode.

In the voice mode, DC current supervision is accomplished by sharing DC current load between the electronic voice network circuit and the DTMF amplifier. The DTMF amplifier operates at a lower DC current operating point in the voice mode. This accomplished by using the dialer mute output to reduce bias to the DTMF amplifier through a transistor as the bias shunt gate. When going to the tone condition in the tone mode, the transistor bias shunt gate is closed (by the mute signal) to obtain full bias thereby powering up the DTMF amplifier. At the same time the mute signal is used to force an electronic voice network voice circuit disconnect to drop the loading effect of the electronic voice network.

The mute signal now also turns on a high impedance current source to substitute the proper DC current supervision in the tone condition for the voice mode current supervision therefore supplied by the now disconnected electronic voice network voice circuit. This reduces the cost and complexity of the electronic voice network as the tone condition circuitry can be separated from the voice mode circuitry. Going to the pulse mode, the action is similar to that of the tone mode except that the DTMF amplifier and the mute switched high impedance current source act as the "make" load during pulsing of the series transistor switch. The electronic voice network is again switched off by the mute signal.

The high impedance current source is switched off during voice mode to eliminate voice mode bridging loss. During toning conditions the current source provides just enough impedance to result in the DTMF amplifier being able to generate high level DTMF tones with very high return loss, e.g. greater than 36 db return loss at 0 dbm level. The combination of the DTMF amplifier output impedance and the DC current source impedance together with the high impedance of the current source for the dialer power supply determine the source impedance during tone mode and the return loss achieved by the proper source impedance.

Third, the DTMF amplifier is of a unique design wherein a single source of DC bias fed from the dialer current source powers both the tone output transistor and the dialer IC and the external DTMF amplifier transistor or transistor input stage if incorporated in the electronic voice network. The transistor DTMF amplifier, external to the dialer IC is a common collectors design with an emitter stabilization resistor. DTMF gain and DC current supervision can be adjusted by adjusting the value of the emitter resistor. This amplifier configuration was found capable of delivering high level tone signals at low distortion with the pulse dial switch transistor as the source of DC power.

The electronic hookswitch sensing circuit is used to signal the "on-hook" state to the dialer IC, the circuit ignores momentary loop current interruptions as might occur during central office switching operations. The circuit also simulates a bounceless hookswitch contact opening and closing for a "clean" signal to the dialer.

It should be noted that the protective devices and details of the voice network are not shown in as much as they do not form a portion of the present invention.

DESCRIPTION OF THE PREFERRED EMBODIMENT

Figure 1:
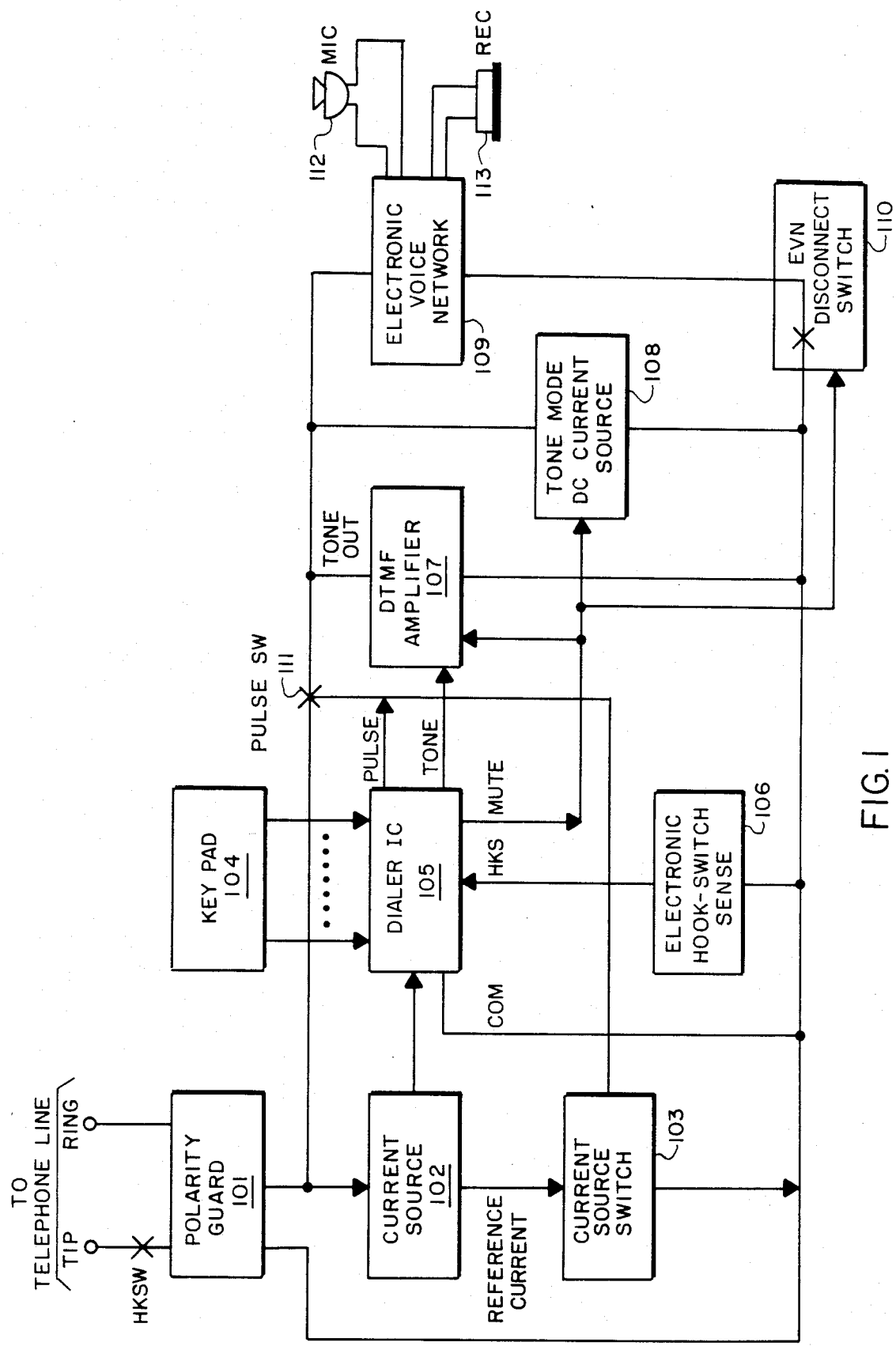
FIG. 1 is a block diagram showing the major functional of a high performance telephone instrument with a combination of pulse and tone dialing facility in accordance with the present invention.

Referring first to FIG. 1, the major functional blocks of the telephone instrument are shown. Those areas pertinent to the present invention include the current source 102, current source switch 103, the DTMF amplifier 107, and the tone mode current source 108. It should be emphasized that the principle feature of the present invention is its organization and structure of the instrument circuitry incorporating the above four items in a logical and unique fashion to achieve the objectives set forth above.

Considering first the current source 102 and current source switch 103, it is noted that the current source outputs current to the dialer IC 105 suitable for all operating conditions in both the pulse and tone modes. Therefore it is not necessary to modify the circuit configuration when changing from pulse mode to tone mode.

The current source 102 is of a type wherein the output current reflects a certain ratio relative to a reference current (a standard technique) and therefore output current can be set to zero by setting the reference current to zero. In the pulse mode it is necessary to have a low leakage current during the break portion of the pulse. This is accomplished uniquely in the present invention by utilizing the pulse dialer output itself to switch the reference current to zero during the "break" portion of the pulse cycle thereby turning off the current source to pulse dialer during the "break" portion of the pulse cycle. In the time during the break portion, the pulse dialer is supplied operating current through a large capacitor (not shown) tied to power supply $V_{DD}$. No problems are experienced with bridging impedance due to the high AC impedance of the current source. Next, the electronic hookswitch sensor circuitry eliminates at second hookswitch mechanical contact, providing a clean change of state signal but ignoring transient loop conditions that can occur which otherwise cause a false "on-hook" signal to the dialer IC 105. The DTMF amplifier 107 is a common collector transistor amplifier wherein the DC bias is fed through a single source from the VDD line to power both the internal pulse dialer IC bi-polar output transistor. With this arrangement high level low distortion tone generation is possible without the need of filtering and decoupling capacitors. In addition the DTMF amplifier 107 is controlled by the pulse dialer 105 mute signal to have a lower DC operating current during voice mode operation thereby reducing voice mode bridging loss. However, the DTMF amplifier 107 is also used to help with DC current supervision in the voice mode and tone mode thereby reducing current load on the electronic voice network 109 integrated circuit.

During the generation of tone (and in the tone mode), the tone mode DC current source 108 serves the dual function of DC current supervision and adjustment of source impedance to achieve high tone level low distortion and higher return loss. As shown in FIG. 1, the tone mode current source 108 works in conjunction with the electronic voice network disconnect switch, both being controlled by the dialer 105 mute output. The electronic voice network 109 is disconnected by the electronic voice network disconnect switch 110 activated by the mute signal from the dialer 105. The electronic voice network 109 and its voice mode impedance and DC characteristics are therefore disconnected from the circuit and the tone mode DC source takes over for the optimum toning characteristics. One advantage of this method is that the electronic voice network circuit 109 characteristics are not critical in the timing operation and a lower cost device can be employed. Otherwise the configuration shown in FIG. 1 also can include the incorporation of the DTMF amplifier 107, the tone mode DC current source 108, electronic voice network circuit disconnect switch 110 and the voice network 109 into a single integrated circuit to reduce discrete part count. The principle of operation however remains the same.

Figure 2:
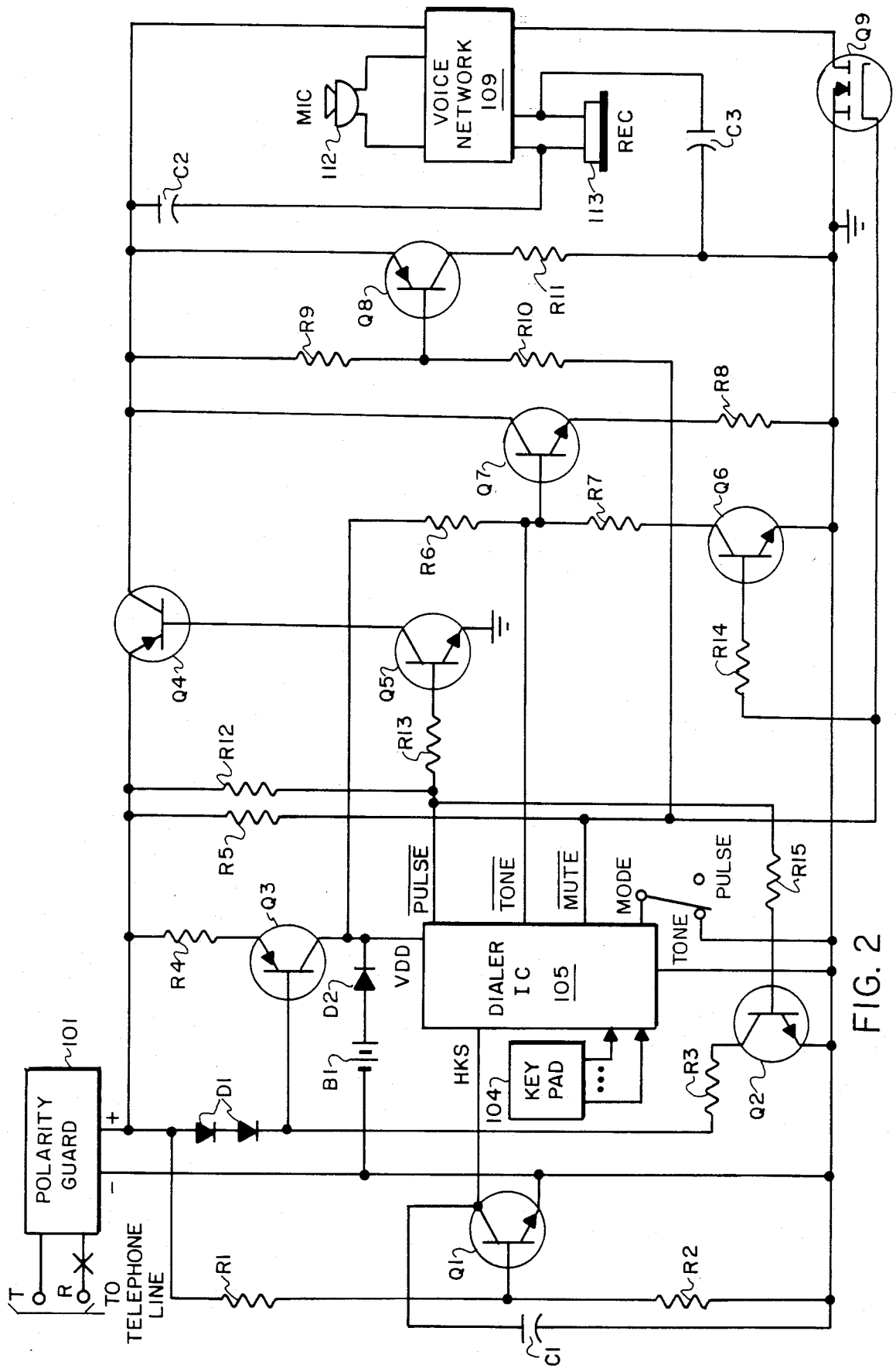
FIG. 2 is a simplified schematic circuit diagram which provides circuit structural details of a high performance telephone instrument with combination pulse and tone dialing per the present invention.

Referring now to FIG. 2, a simplified schematic of the telephone instrument circuitry in accordance with the present invention is shown. Transistor Q1 acts as the electronic hookswitch sense device with capacitor C1 forming the time constant for the change of state time constant. The time constant is set so that the "on-hook" state is not sensed until at least 330 milliseconds after a true "on-hook" condition occurs, thereby ignoring intermediate transients. Resistor R2 provides DC bias stabilization for transistor Q1. Transistor Q2 switches the current source transistor Q3 on and off depending on the logic state of the pulse output on the dialer IC 105. The reference current for transistor Q3 flows through diodes D1, resistor R3 and transistor Q2. The ratio of resistors R4 to R3 determines the current into the power supply bus VDD. Battery B1 and diode D2 provide power for programming and memory retention during the "on-hook" state. Memory is retained in the dialer IC 105. Transistor Q5 causes transistor Q4 to pulse the loop under signal from the pulse dialer integrated circuit 105 pulse output. In the pulse mode, the DTMF amplifier and the tone mode DC current source are disconnected in the "break" portion of the cycle by transistor Q4. In the "make" portion, transistor Q7 and Q8 are turned on to provide the proper "make" DCR. Electronic voice network 109 is disconnected during the entire pulsed out digit by the mute signal to transistor Q9. Transistor Q6 acts to reduce DC current through transistor Q7 during voice mode operation and increase the impedance of the DTMF amplifier to reduce bridging loss while in the voice mode. In the tone output mode, and pulse mode, transistor Q6 is cut off to allow full operating DC current to flow in transistor Q7 for DC supervision and tone generation. The tone amplifier transistor Q7 is controlled by a relatively high value emitter resistor R8 which controls gain and reduces distortion when properly set. Transistor Q8 comprises the tone mode DC current source and impedance matching network to the loop while in the tone output state Resistors R9, R10 and R11 provide the proper bias versus loop condition. Capacitor C2 and C3 provide some feedback of tone to the user during pulsing and tone output without significant effect on voice mode characteristics.

Resistor R12 provides a pull-up resistor for the open drain output of the dialer integrated circuit 105 in the pulse mode. Resistors R13, R14 and R15 limit base current in transistors Q5, Q6 and Q2 respectively. A dialer device 105 used to develop the circuit of the present invention is that manufactured by Sharp under their piece number type LR4803. The electronic voice network is manufactured by GTE Microcircuits as type HD970114L. The present circuitry would likewise work with similar dialer and electronic voice network integrated circuits.

In summary the most important aspects of the present invention are the method of supplying current and switching the current supply for the dialer integrated circuit, the method of amplifying DTMF tone signals and the use of the special tone mode DC current source.

It will be obvious to those skilled in the art that numerous modifications of the present invention may be made without departing from the spirit of the present invention which shall be limited only by the scope of the claims appended hereto.

What is claimed is:

1. A subscriber's telephone instrument circuit connected to a telephone line and including a voice network connected to said line, a dialer circuit operated in response to a keypad connected thereto, to generate dial pulses for transmission over said telephone line and operated in the alternative to generate tone signals for transmission over said telephone line, the improvement comprising:

a first current source connected directly to said dialer and a current source switch connected between said dialer and said current source, said switch operated in response to a break portion of pulses generated by said dialer to turn off said current source during said pulse break portion;

a tone signal amplifier connected between said dialer and said telephone line operated in response to tone signals to amplify said signals and couple said amplified tone signals to said telephone line; and a second current source connected to said telephone line and including a circuit connection to said dialer operated in response to said dialer to provide DC current supervision and to adjust circuit impedance to achieve high tone level.

2. A subscriber's telephone instrument circuit as claimed in claim 1, wherein: there is further included a hookswitch operated to connect said circuit to said telephone line and a hookswitch sensing circuit connected to said dialer circuit operated in response to detection of operation of said hookswitch, to provide a change of state signal to said dialer circuit.

3. A subscriber's telephone instrument circuit as claimed in claim 1, wherein: there is further included voltage storage means connected to said dialer and operated to supply operating current to said dialer during the break portion of said dial pulses.

4. A subscriber's telephone instrument circuit as claimed in claim 1, wherein: said tone amplifier is a common collector transistorized amplifier wherein DC bias is fed from a single source to provide power to both said dialer and said amplifier transistor.

5. A subscriber's telephone instrument circuit as claimed in claim 1, wherein: said tone amplifier is controlled by said dialer to have a lower DC operating current during voice mode operation.

6. A subscriber's telephone instrument circuit as claimed in claim 2, wherein: said hookswitch sense circuit comprises a transistor and an associated capacitor, forming the time constant for said change of state signal to said dialer circuit.

7. A subscriber's telephone instrument circuit as claimed in claim 1, wherein: there is further included battery means connected to said dialer to provide power during an "on-hook" state of said subscriber's telephone instrument circuit.

8. A subscriber's telephone instrument circuit as claimed in claim 1, wherein: there is further included switching means connected to said telephone line including a circuit connection to said dialer, operated in response to said dialer to periodically make and brake said telephone line to generate said dial pulses.

* * * * *